(12) United States Patent
Fiorillo et al.

(10) Patent No.: US 7,966,023 B2
(45) Date of Patent: Jun. 21, 2011

(54) LAWFUL INTERCEPTION OF LOCATION BASED SERVICE TRAFFIC

(75) Inventors: Lorenzo Fiorillo, S. Nicola la Strada (IT); Maurizio Iovieno, Mercato San Severino (IT); Alessandro Lala, Naples (IT); Enrico De Luca, Caserta (IT); Pompeo Santoro, Baronissi (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 564 days.

(21) Appl. No.: 11/658,841

(22) PCT Filed: Jul. 29, 2004

(86) PCT No.: PCT/IT2004/000417
§ 371 (c)(1),
(2), (4) Date: Oct. 2, 2008

(87) PCT Pub. No.: WO2006/011165
PCT Pub. Date: Feb. 2, 2006

(65) Prior Publication Data
US 2010/0130231 A1    May 27, 2010

(51) Int. Cl.
*H04W 24/00* (2009.01)
(52) U.S. Cl. .................................. 455/456.3; 455/404.2
(58) Field of Classification Search ........................ None
See application file for complete search history.

(56) References Cited

U.S. PATENT DOCUMENTS

| | | | |
|---|---|---|---|
| 6,463,288 B1 | 10/2002 | Havinis et al. | |
| 6,996,392 B2* | 2/2006 | Anderson et al. | 455/404.2 |
| 7,512,234 B2* | 3/2009 | McDonnell et al. | 380/247 |
| 2004/0176103 A1* | 9/2004 | Trossen et al. | 455/456.3 |
| 2005/0003797 A1* | 1/2005 | Baldwin | 455/404.1 |
| 2005/0153706 A1* | 7/2005 | Niemenmaa et al. | 455/456.1 |
| 2010/0003976 A1* | 1/2010 | Zhu et al. | 455/433 |
| 2010/0227628 A1* | 9/2010 | Anderson et al. | 455/456.3 |

FOREIGN PATENT DOCUMENTS

WO    03/085936    10/2003

OTHER PUBLICATIONS

International Search Report for PCT/IT2004/000417 mailed Mar. 10, 2005.
*Telecommunication securitx; Law Interception (LI); Description of GPRS HI3*, ETSI TR 101 876 V1.1.1, Jan. 2001, pp. 1-15, XP002225046.

* cited by examiner

*Primary Examiner* — Ajit Patel (57) ABSTRACT

The present invention relates to methods and arrangements in a telecommunication system to generate Interception Related Information IRI related to positioning activities involving a mobile subscriber/equipment MSA. The system provides information to an Intercept configuration unit ICU, collected from an Intercept Access Point IAP; MSC, GMLC that is associated to the monitored subscriber/equipment. The method comprises the following steps: receiving to the Intercept Access Point IAP; MSC, GMLC from the Intercept configuration unit ICU, a request to monitor the mobile subscriber/equipment MSA. Registration in the Intercept Access Point IAP; MSC, GMLC, of a positioning activity involving the monitored subscriber/equipment. Delivering information related to the positioning activity, from the Intercept Access Point IAP; MSC, GMLC to the Law Enforcement Agency LEA.

13 Claims, 4 Drawing Sheets

LAWFUL INTERCEPTION OF LOCATION BASED SERVICE TRAFFIC

This application is the US national phase of international application PCT/IT2004/000417 filed 29 Jan. 2004, which designated the U.S., the entire content of which is hereby incorporated by reference.

TECHNICAL FIELD

The present invention relates to methods and arrangements in a telecommunication system to generate Interception Related Information related to location services involving a mobile subscriber/equipment who/which is target for lawful interception.

BACKGROUND ART

Three major trends currently occurs in telecommunication, i.e. 1) increasing amount of data traffic, 2) real-time communication goes from circuit switching to packet switching, and 3) new focus of real-time in packet switching, for example video and multimedia. The ever increasing amount of data traffic as well as real-time communication in packet switched networks has lead to a demand for monitoring of this data traffic with the same level of security and confidentiality as known from circuit switched networks monitoring.

One kind of monitoring is lawful interception, i.e. the act of intercepting a communication on behalf of a Law Enforcement Agency. Interception of Content of Communication CC i.e. speech and data is known. Interception of Intercept Related Information IRI is also known. Intercept Related Information is defined as signaling information related to target subscribers, for example call establishment. As an example, in Circuit Switching domain, the sending of IRI to a monitoring function is triggered by the following call-related and non-call related events:
  Call Establishment
  Answer
  Supplementary Service
  Handover
  Release
  SMS
  Location Update
  Subscriber Controlled Input Appropriate session related and session unrelated events trigger the sending of IRI to a monitoring function in case of Packet Switching communication.

Beyond the demand for monitoring of IRI and CC, demand for monitoring of IRI regarding location-based services is desired. The existing standardized location based services architecture can be found in the 3GPP specifications TS 23.271. According to the related Standard, a Gateway Mobile Location center GMLC is the first node external Location Services LCS client requiring information, accesses in a mobile network. The GMLC requests routing information, handles positioning requests and forwards location estimates to the Location Services client. Mobile positioning enables an operator to provide location-based services to his customer. Position procedures that can be used to obtain the location estimate are:
  Mobile Terminating Location Request, which is requested by a specific request sent from a Location Services client external to the network via a Gateway Mobile Location Center
  Mobile Originating Location Request, which is requested by the User Equipment
  Network Induced Location Request, which is triggered in case the User Equipment is performing an emergency call.

Location-based services are forecasted to soon be one of the most important sources of operator revenue. The position can be used to provide mobile subscribers with information and services that take advantage of the given geographical location. The location estimates can also be used for charging and billing.

According to current Lawful Interception standards, it is not possible to report, by means of existing Intercept Related Information events, the occurrence of traffic and information related to Location Services for a monitored subscriber/equipment. In order to monitor location-based services today, an agency should request the location based service provider with such detailed information, but a Lawful Interception Agency could be unaware of which providers are offering services to the target subscriber making it quite difficult to obtain such data from the telecommunication system.

DISCLOSURE OF THE INVENTION

The present invention relates to problems how to integrate existing Location Services architecture into Lawful Interception to provide Lawful Interception Agencies with accurate information related to positioning activities involving a monitored mobile subscriber/equipment.

The problems are solved by the invention by generating new properly structured Interception Related Information related to location-based services/information.

More in detail, the problems are solved by methods and arrangements in a telecommunication system to generate Interception Related Information related to positioning activities involving a mobile subscriber/equipment. The telecommunication system provides information to an Intercept configuration unit, collected from an Intercept Access Point that is associated to the monitored subscriber/equipment. The method comprises the following steps:
  Receiving to the Intercept Access Point from the Intercept configuration unit, a request to monitor the mobile subscriber/equipment
  Registration in the Intercept Access Point, of a positioning activity involving the monitored subscriber/equipment
  Delivering information related to the positioning activity, from the Intercept Access Point to the Law Enforcement Agency.

Advantages with the invention are:
  Possibility to provide Lawful Interception Agencies with accurate information related to Location Services traffic using resources already allocated in the network and without traffic disturbance of additional signaling
  Positioning information will be obtained without any intrusive mechanism or disturbance over the transaction established by the target
  Positioning information will be obtained without any ad-hoc generated Location Services traffic.

The invention will now be described more in detail with the aid of preferred embodiments in connection with the enclosed drawings.

WAYS OF CARRYING OUT THE INVENTION

Figure 1:
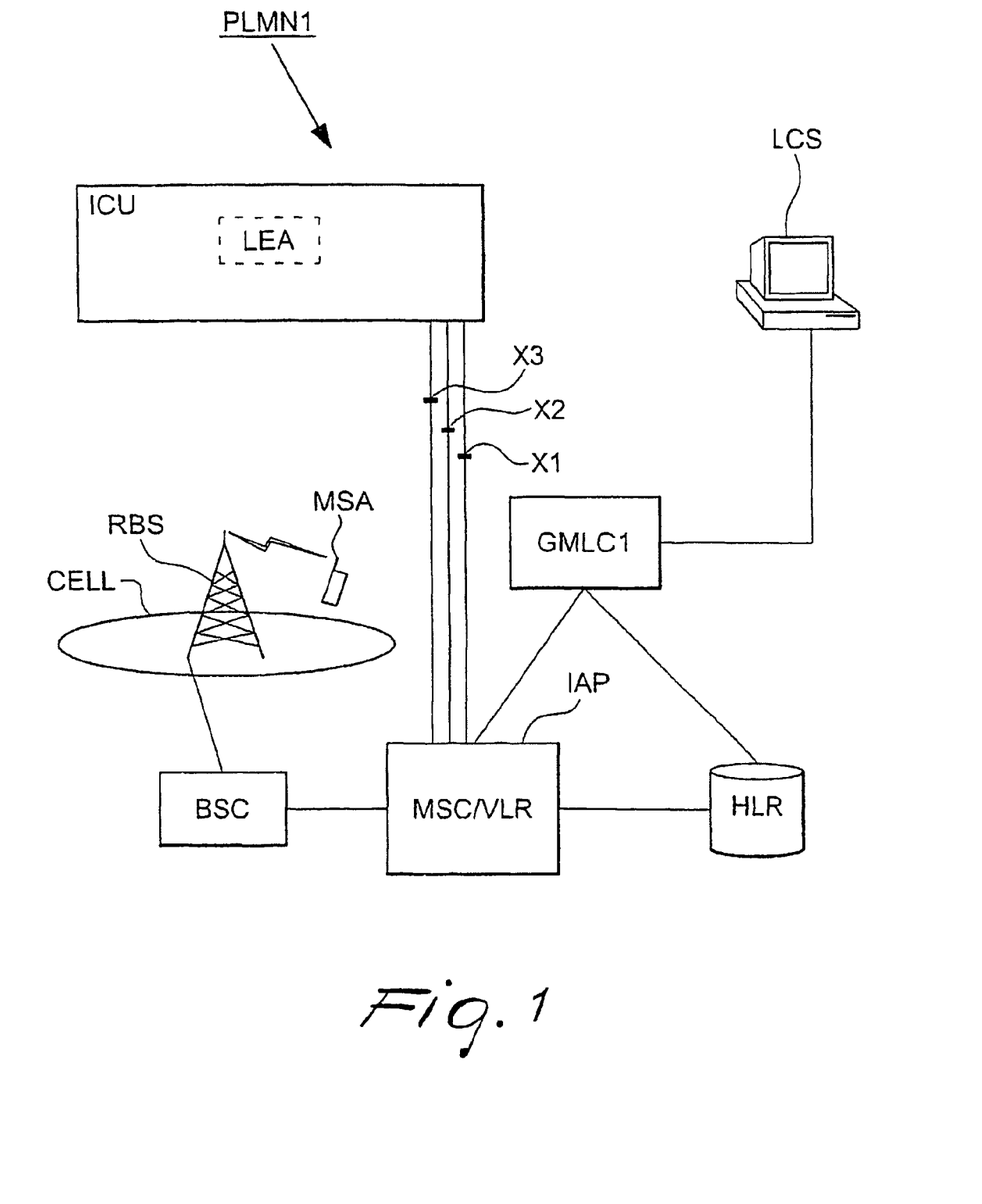
FIG. 1 discloses a block schematic illustration of a telecommunication system in which a Mobile Subscriber Center acts as Intercept Access Point.

FIG. 1 discloses a Public Land Mobile Network PLMN1. The Network in this example is a GSM network and comprises a Gateway Mobile Location Center GMLC1 connected to a Mobile Subscriber Center MSC/VLR. The MSC/VLR includes a Visitor Location Register in which mobile subscribers that are visiting the MSC control area are registered. The Mobile Subscriber Center MSC/VLR is connected to a Base Station Controller BSC that is connected to a Radio Base Station RBS. The RBS covers a radio cell CELL in which a mobile subscriber/equipment MSA is located. The Base Station Controller BSC controls a group of Radio Base Stations (only RBS is shown in the figure), and the Mobile Subscriber Center MSC/VLR controls a number of Base Station Controllers (only BSC is shown in the figure). The GMLC1 contains functionality required to support location services. The GMLC1 is the first node an external Location Services client accesses in the PLMN. In FIG. 1 a Location Services Client LCS is schematically shown as directly connected to the GMLC1. A Home Location Register HLR is connected to both the MSC/VLR and to the GMLC1. The GMLC1 may request routing information to the mobile subscriber/equipment from the Home Location Register HLR, i.e. information about in which MSC/VLR the mobile is registered. Positioning requests are sent from the GMLC1 to the MSC/VLR. After registration authorization and possibly paging procedure, the MSC/VLR will handle the positioning procedure for the mobile subscriber, receive positioning information, and forward final location estimates to the GMLC. An Intercept Configuration Unit ICU is connected to the MSC/VLR in this example. The ICU is connected to the MSC/VLR via three interfaces X1, X2 and X3. The ICU and the interfaces will be further explained in FIG. 2.

Figure 2:
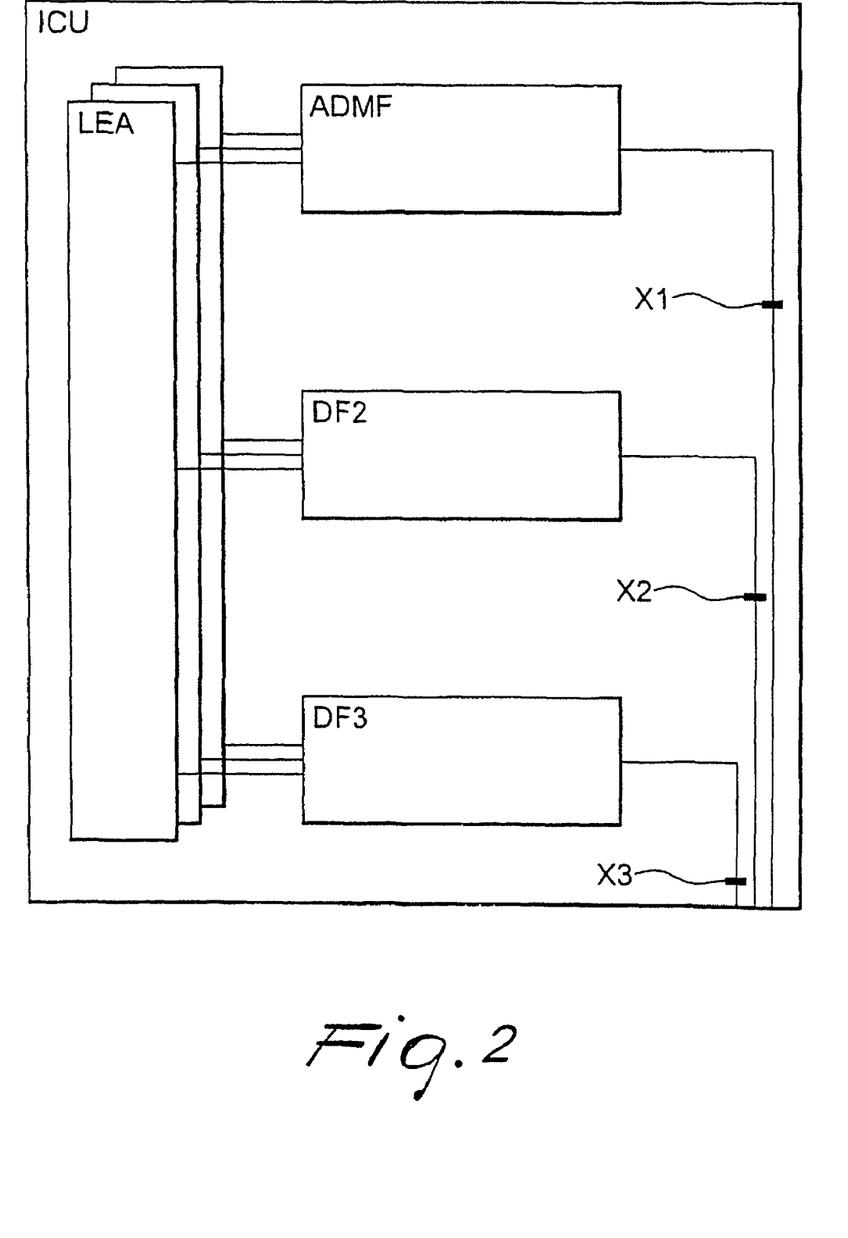
FIG. 2 discloses a block schematic illustration of an Intercept Configuration Unit in the telecommunication system.

The Intercept Configuration Unit ICU is disclosed in FIG. 2. The ICU comprises at least one Law Enforcement Agency LEA (three blocks representing different LEAs are shown in FIG. 2). Each LEA is connected to three Mediation Functions respectively for ADMF, DF2, DF3 i.e. an Administration Function ADMF and two Delivery Functions, a so-called second Delivery Function DF2 and third Delivery Function DF3. The Administration Function and the Delivery Functions are each one connected to the telecommunication network via the interfaces X1-X3. The ADMF is connected via the interface X1, DF2 is connected via X2 and DF3 is connected via X3. The Administration Function ADMF is together with the delivery functions used to hide from the network that there might be multiple activations by the different Law Enforcement Agencies. The messages sent from the ADMF to the network via the X1 interface comprise identities of the subscriber/equipment that is to be monitored, i.e. target identities. The second Delivery Function DF2 receives Intercept Related Information IRI from the network and DF2 is used to distribute the IRI to relevant Law Enforcement Agencies. The third Delivery Function DF3 receives Content of Communication CC, i.e. speech and data, and is used to distribute the CC to relevant LEAs. DF3 is responsible for call control signaling and bearer transport for an intercepted product. Intercept Related Information IRI, received by DF2, which also are called Events, are either call related or non-call related. Intercept Related Information IRI is defined as signaling information related to target subscribers. Call establishment is an example of a call related event and Location Update is an example of a non-call related event.

According to a first embodiment of invention, the already existing events have been enhanced to include also monitoring of location-based services, i.e., information linked to positioning of a target subscriber/equipment. If a well specified positioning activity for a mobile subscriber/equipment occurs, an Intercept Access Point IAP, which in this first embodiment is the MSC/VLR, sends relevant data to DF2. This will later be explained more in detail Examples of new different events related to positioning activities are as follows:

Reception of a positioning request from an external client. This event is also called a first Mobile Terminating-Location Request MT-LR1. The event MT-LR1 comprises reception of a positioning request to the Intercept Access Point from the Location Services client.

Delivering of a location result to an external client. This event is also called a second Mobile Terminating-Location Request MT-LR2. The event MT-LR2 comprises delivering of location result from the Intercept Access Point to the Location Services client Reception of a positioning request from a target subscriber/equipment. This event is also called a first Mobile Originating-Location Request MO-LR1. The event MO-LR1 comprises reception to the Intercept Access Point of a positioning request from the monitored mobile subscriber/equipment.

Delivering of a location result to an external client. This event is also called Mobile Originating-Location Request MO-LR2. The event MO-LR2 comprises delivering of location result from the Intercept Access Point to the Location Services client.

Delivering of a location result to a target subscriber/equipment This event is also called a third Mobile Originating-Location Request MO-LR3. The event MO-LR3 comprises delivering of location result from the Intercept Access Point to the monitored mobile subscriber/equipment.

Triggering of positioning request from a network. This event is also called a first Network Induced-Location Request NI-LR1. The event NI-LR1, as defined in the standards, is stated to be for emergency call, i.e triggered when CM Service Request for emergency Services is received from the monitored mobile subscriber/equipment Delivering of location result to an Emergency Center. This event is also called a second Network Induced-Location Request NI-LR2. The event NI-LR2 comprises delivering of location result from the Intercept Access Point to the Emergency Center.

It is to be observed that the above stated events only are examples of events related to location-based services that are possible to use in the invention.

A method according to the first embodiment of the invention will now be explained more in detail. The explanation is to be read together with FIGS. 1 and 2. The method comprises the following steps:

The Law Enforcement Agency LEA sends a request to the Administration Function ADMF to activate interception of the mobile subscriber/equipment MSA, i.e. to monitor MSA.

The ADMF forwards a target identity of the mobile subscriber/equipment MSA, to the Intercept Access Point IAP, i.e. to the Mobile Subscriber Center MSC/VLR.

A positioning request regarding the mobile subscriber/
equipment MSA is sent from the external client LCS to
the Gateway Mobile Location Center GMLC1.

A request to provide subscriber location is sent from the
Gateway Mobile Location Center GMLC1 to the Mobile
Subscriber Center MSC/VLR. To send the request, the
GMLC1 may need to request routing information to the
MSA from the Home Location Register HLR, i.e. information about in which MSC/VLR the mobile is registered. The request sent from GMLC1 to MSC/VLR corresponds to the event MT-LR1—Reception of a positioning request from an external client.

Upon receiving the event MT-LR1, the Mobile Subscriber
Center MSC/VLR informs the Law Enforcement
Agency LEA about the ongoing positioning activity by
sending Interception Related Information IRI, i.e. the
received event MT-LR1, via the interface X2 to the second Delivery Function DF2. The IRI is forwarded from
DF2 to the LEA If needed, the MSC/VLR sends a paging message to the
mobile subscriber and receive positioning information.
This method step is in accordance with the existing
standardized location based services architecture.

The positioning information received to the MSC/VLR is
intended to be forwarded to the external client LCS and
corresponds to the event MT-LR2—Delivering of a
location result to an external client.

Upon receiving the event MT-LR2, the Mobile Subscriber
Center MSC/VLR forwards the positioning information
to the Law Enforcement Agency LEA by sending the
mobile subscriber/equipments geographical position via
the interface X2 to the second Delivery Function DF2.
The geographical position is forwarded from DF2 to the
LEA.

As an alternative to the relative order of the above method steps different variations can be conceived. For example may the Intercept Related Information be sent to the LEA together with the geographical position upon receiving the event MT-LR2.

Figure 3:
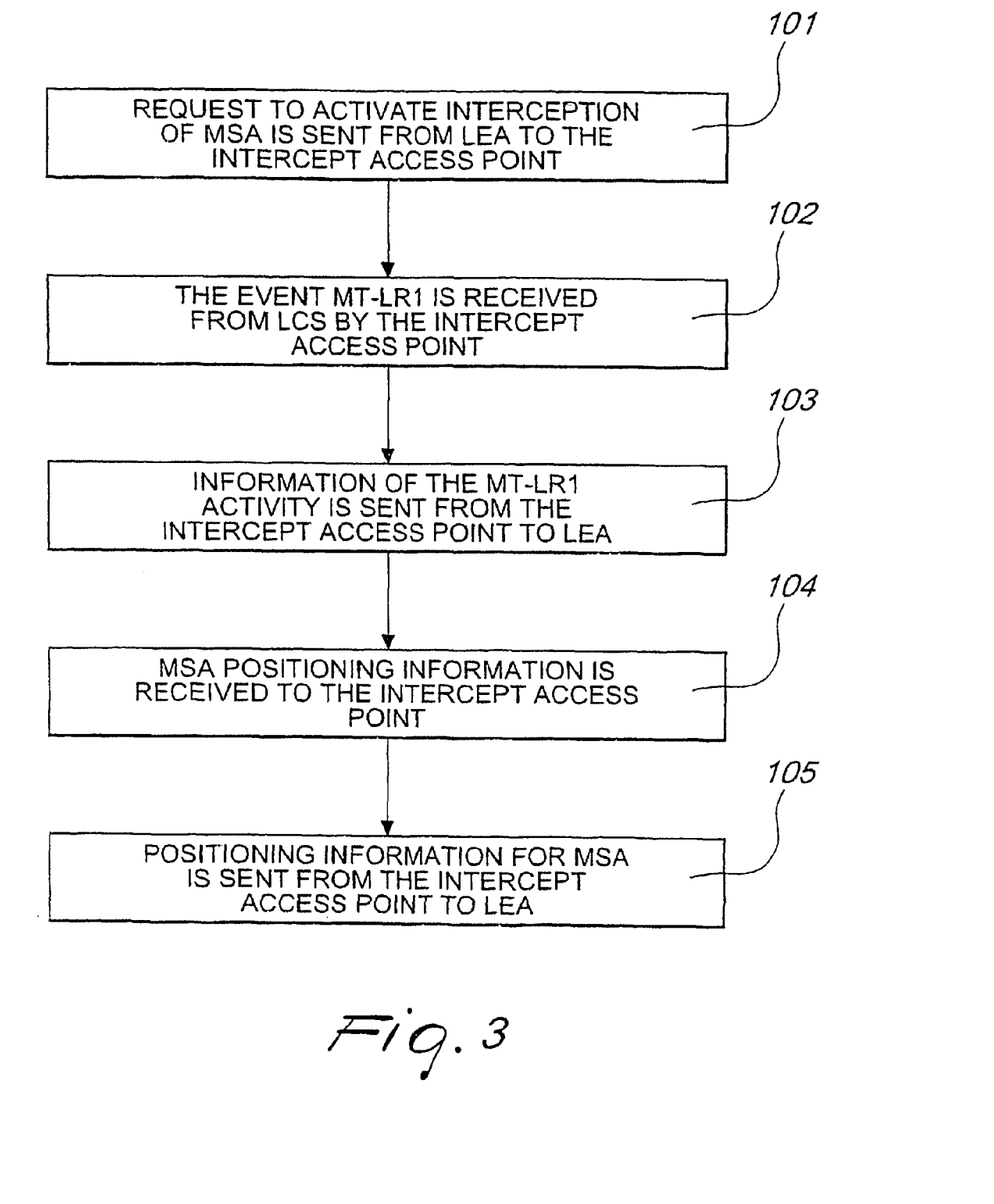
FIG. 3 discloses a flow chart illustrating some essential method steps of the invention.

FIG. 3 discloses a flowchart in which some more important steps are shown. The flowchart is to be read together with the earlier shown figures. The flowchart comprises the following steps:

The Law Enforcement Agency LEA sends a request to the
Intercept Access Point, to activate interception of the
mobile subscriber/equipment MSA. A block 101 discloses this step in FIG. 3.

A positioning request regarding the mobile subscriber/
equipment MSA is sent from the external client LCS to
the to the Mobile Subscriber Center MSC/VLR. The
request corresponds to the event MT-LR1. A block 102
discloses this step in FIG. 3.

The Mobile Subscriber Center MSC/VLR informs the Law
Enforcement Agency LEA about the ongoing position
activity. A block 103 discloses this step in FIG. 3.

Positioning information is received to MSC/VLR in accordance with the existing standardized location based services architecture. The positioning information received
to the MSC/VLR corresponds to the event MT-LR2. A
block 104 discloses this step in FIG. 3.

The Mobile Subscriber Center MSC/VLR forwards mobile
subscriber/equipments geographical position to the
LEA. A block 105 discloses this step in FIG. 3.

Figure 4:
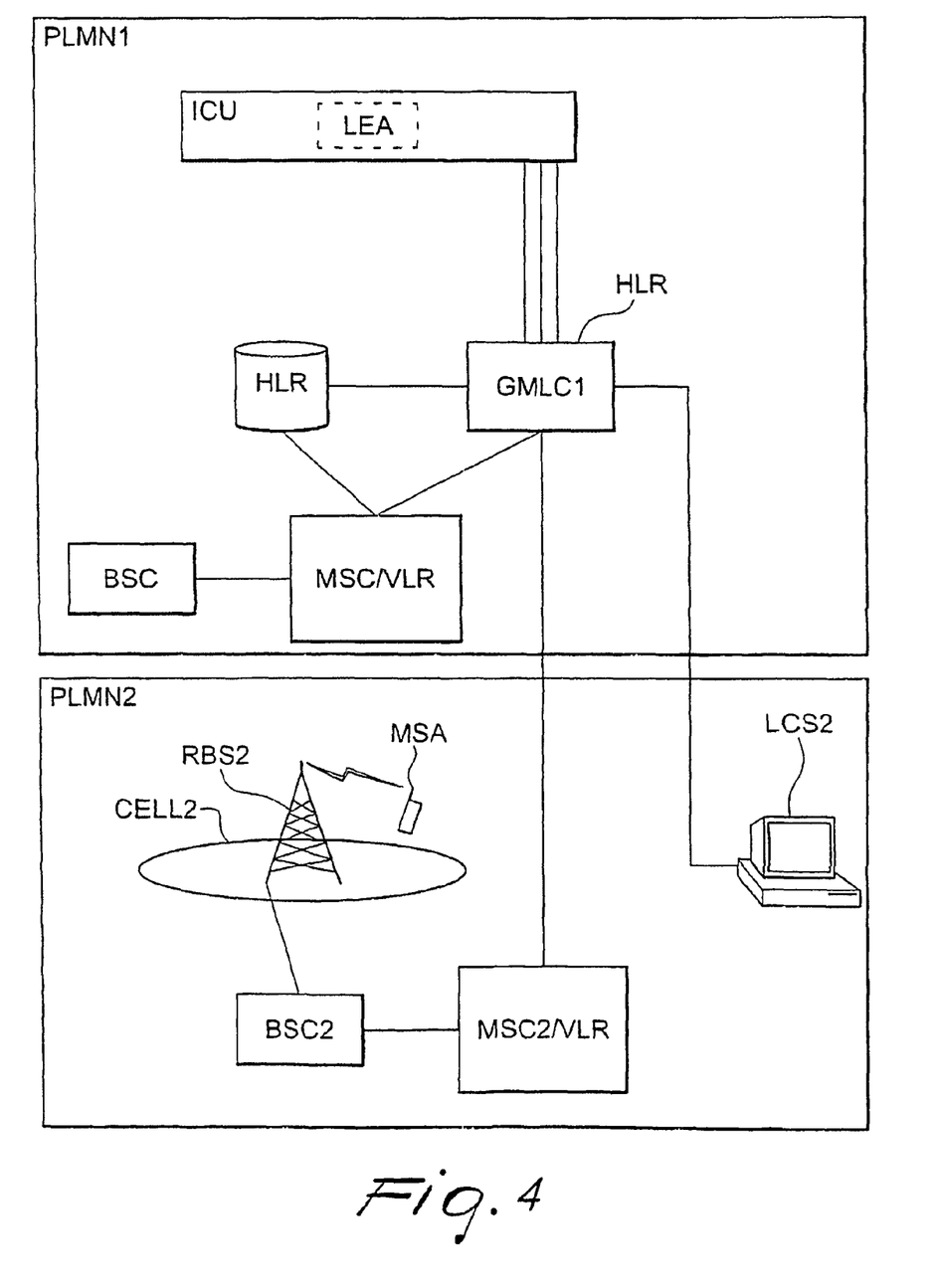
FIG. 4 discloses a block schematic illustration of a telecommunication system in which a Gateway Mobile Subscriber Center acts as Intercept Access Point.

A second embodiment of the invention will now be discussed where the Intercept Access Point IAP is in the Gateway Mobile Location Center GMLC1. FIG. 4 discloses a telecommunication system comprising a first Public Land Mobile Network PLMN1 which is the same network as was shown earlier in FIG. 1. The system also comprises a second Public Land Mobile Network PLMN2 comprising a Mobile Subscriber Center MSC2/VLR connected to a Base Station Controller BSC2 that is connected to a Radio Base Station RBS2. The RBS2 covers a radio cell CELL2 in which the same mobile subscriber/equipment MSA that was located in PLMN1 in the first embodiment, now is located. The home network of the mobile subscriber/equipment MSA is PLMN1, and PLMN2 in this embodiment is a visited network. In this second embodiment the Gateway Mobile Location Center GMLC1 in PLMN1 is acting as Intercept Access Point IAP, i.e. the Intercept Configuration Unit ICU is connected to the GMLC1. The ICU that earlier was explained together with FIG. 2 works in the same way in this second embodiment. A second Location Services client LCS2 is geographically located in the second Public Land Mobile Network PLMN2. This second embodiment deals with requiring information about the MSA and since PLMN1 is MSAs home network, LCS2 has to go via GMLC1 to receive information about MSA. LCS2 is schematically shown in FIG. 4 as directly connected to GMLC1. It is to be noted that the network configuration in the second embodiment is an example. The invention applies also to a GMLC in PLMN2 or even located in a third Public Land Mobile Network, different from PLMN1 and PLMN2. Moreover the LCS2 can be in whatever PLMN: it could be in PLMN1, PLMN2 or in another PLMN, different from PLMN1 and PLMN2.

A method according to the second embodiment of the invention will now be explained more in detail. The explanation is to be read together with FIGS. 2 and 4. The method comprises the following steps:

The Law Enforcement Agency LEA sends a request to the
Administration Function ADMF to activate interception
of the mobile subscriber/equipment MSA, i.e. to monitor MSA.

The ADMF forwards a target identity of the mobile subscriber/equipment MSA, to the Intercept Access Point
IAP, i.e. to the Gateway Mobile Location Center
GMLC1.

A positioning request regarding the mobile subscriber/
equipment MSA is sent from the second Location Services client LCS2 to the Gateway Mobile Location Center GMLC1. The request sent from LCS2 to GMLC1
corresponds to the event MT-LR1—Reception of a positioning request from an external client.

Upon receiving the event MT-LR1, the Gateway Mobile
Location Center GMLC1 informs the Law Enforcement
Agency LEA about the ongoing position activity by
sending Interception Related Information IRI, i.e. the
received event MT-LR1, to the second Delivery Function DF2. The IRI is forwarded from DF2 to the LEA.

A request to provide subscriber location is sent from the
Gateway Mobile Location Center GMLC1 to the Mobile
Subscriber Center MSC2/VLR. To send the request, the
GMLC1 may need to request routing information to the
MSA from the Home Location Register HLR, i.e. information about in which Mobile Subscriber Center the
mobile is registered.

The MSC2/VLR sends a paging message to the mobile
subscriber and receive positioning information. This
method step is in accordance with the existing standardized location based services architecture.

The positioning information received to the MSC2/VLR is
to be forwarded to the external client LCS2. The information is sent from MSC2/VLR to GMLC1 and then forwarded to LCS2. This corresponds to the event MT-LR2—Delivering of a location result to an external client.

Upon receiving the event MT-LR2, the Gateway Mobile Location Center GMLC1 forwards the positioning information to the Law Enforcement Agency LEA by sending the mobile subscriber/equipments geographical position to the second Delivery Function DF2. The geographical position is thereafter forwarded from DF2 to the LEA.

It is to be noted that the earlier shown events MO-LR3, NI-LR1 and NI-LR2 preferably apply to the first embodiment.

Different variations are possible within the scope of the invention. The Intercept Access Point IAP may for example be another node type than the ones in the described embodiments. The Intercept Access Point can for example be a Serving GPRS Support Node. The invention is applicable in both circuit switched (connection oriented) and packet switched (connection less) networks. The disclosed GSM network/access in the described embodiments is just an example of a network/access that can be used. Other examples would be a 3G WCDMA network, IP Multimedia Subsystem and Wireless LAN access.

The invention is in other words of course not limited to the above described and in the drawings shown embodiments but can be modified within the scope of the enclosed claims.

The invention claimed is:

1. Method in a telecommunication system to generate Interception Related Information related to Location-based Services events involving a mobile subscriber/equipment, which system provides information to an Intercept Configuration Unit, collected from an Intercept Access Point that is associated to the monitored subscriber/equipment, which method comprises the following steps:
   receiving to the Intercept Access Point from the Intercept configuration unit, a request to monitor the mobile subscriber/equipment; characterized in
   registration in the Intercept Access Point, of a Location-based Service event involving the monitored subscriber/equipment;
   sending the Location-based Service event comprising identification of a client requesting positioning information of the mobile subscriber/equipment, from the Intercept Access Point to the Intercept Configuration Unit.

2. Method to generate Interception Related Information of a monitored subscriber/equipment according to claim 1 whereby the event delivered from the Intercept Access Point to the Law Enforcement Agency further comprises geographical location for the mobile subscriber/equipment.

3. Method In a mobile telecommunication system according to claim 1 whereby the Intercept configuration unit comprises a Law Enforcement Agency attached to an Administration Function, which method comprises the following further steps:
   sending from the Law Enforcement Agency to the Administration Function, the request to monitor the mobile subscriber/equipment;
   forwarding the request from the Administration Function to the Intercept Access Point.

4. Method to generate Interception Related Information of a monitored subscriber/equipment according to claim 1, which monitored mobile subscriber/equipment is located in a first Public Land Mobile Network in the telecommunication system and whereby the Intercept Access Point is a Mobile Subscriber Center located in the first Mobile Network.

5. Method to generate Interception Related Information of a monitored subscriber/equipment according to claim 4, which telecommunication system comprises an external client associated to the Mobile Subscriber Center and whereby the Location-based Services event comprises any of the following steps:
   Reception of a positioning request from the external client,
   Delivering of location result to the external client,
   Reception of a positioning request from the target subscriber,
   Delivering of location result to the external client,
   Delivering of location result to the target subscriber,
   Triggering of positioning request from the network, and
   Delivering of location result to an emergency center in the network.

6. Method to generate interception Related Information of a monitored subscriber/equipment according to claim 1, whereby the Intercept Access Point is a Gateway Mobile Location Center located in a first Public Land Mobile network and which monitored mobile subscriber/equipment is located in a second network in the telecommunication system.

7. Method to generate Interception Related Information of a monitored subscriber/equipment according to claim 6, which telecommunication system comprises an external client associated to the Gateway Mobile Subscriber Center and whereby the Location-based Services event comprises any of the following steps:
   Reception of a positioning request from the external client,
   Delivering of location result to the external client,
   Reception of a positioning request from the target subscriber, and
   Delivering of location result to the external client.

8. Arrangement in a telecommunication system to generate Interception Related Information related to Location-based Services events involving a mobile subscriber/equipment, which system provides information to an Intercept Configuration Unit, collected from an Intercept Access Point that is associated to the monitored subscriber/equipment, which arrangement comprises:
   means for receiving to the Intercept Access Point from the Intercept configuration unit, a request to monitor the mobile subscriber/equipment characterized in
   means for registration in the Intercept Access Point, of a Location-based Services event involving the monitored subscriber/equipment;
   means for sending the Location-based Services event comprising identification of a client requesting positioning information of the mobile subscriber/equipment, from the Intercept Access Point to the intercept Configuration Unit Law.

9. Arrangement in a mobile telecommunication system according to claim 8 which Intercept configuration unit comprises a Law Enforcement Agency attached to an Administration Function and which arrangement further comprises:
   means for sending from the Law Enforcement Agency to the Administration Function, the request to monitor the mobile, subscriber/equipment;
   means for forwarding the request from the Administration Function to the Intercept Access Point.

10. Arrangement to generate Interception Related Information of a monitored subscriber/equipment according to claim 8, which monitored mobile subscriber/equipment is located in a first Public Land Mobile Network in the telecommunication system and whereby the Intercept Access Point is a Mobile Subscriber Center located in the first Mobile Network.

11. Arrangement to generate Interception Related Information of a monitored subscriber/equipment according to claim 10, which telecommunication system comprises an external client associated to the Mobile Subscriber Center, which arrangement comprises at least one of the following means:
- Means for reception of a positioning request from the external client,
- Means for delivering of location result to the external client,
- Means for reception of a positioning request from the target subscriber,
- Means for delivering of location result to the external client,
- Means for delivering of location result to the target subscriber,
- Means for triggering of positioning request from the network, and
- Means for delivering of location result to an emergency center in the network.

12. Arrangement to generate Interception Related information of a monitored subscriber/equipment according to claim 10, whereby the Intercept Access Point is a Gateway Mobile Location Center located in a first Public Land Mobile network and which monitored mobile subscriber/equipment is located in a second network in the telecommunication system.

13. Arrangement to generate Interception Related Information of a monitored subscriber/equipment according to claim 12 which telecommunication system comprises an external client associated to the Gateway Mobile Subscriber Center and which arrangement comprises at least one of the following means:
- Means for reception of a positioning request from the external client,
- Means for delivering of location result to the external client,
- Means for reception of a positioning request from the target subscriber, and
- Means for delivering of location result to the external client.

\* \* \* \* \*

UNITED STATES PATENT AND TRADEMARK OFFICE
CERTIFICATE OF CORRECTION

| | | |
|---|---|---|
| PATENT NO. | : 7,966,023 B2 | |
| APPLICATION NO. | : 11/658841 | |
| DATED | : June 21, 2011 | |
| INVENTOR(S) | : Fiorillo et al. | |

It is certified that error appears in the above-identified patent and that said Letters Patent is hereby corrected as shown below:

On the Face Page, in Field (56), under "OTHER PUBLICATIONS", in Column 2, Line 3, delete "securitx;" and insert -- security; --, therefor.

In Column 4, Line 12, delete "detail" and insert -- detail. --, therefor.

In Column 4, Line 24, delete "client" and insert -- client. --, therefor.

In Column 4, Lines 36-37, delete "equipment" and insert -- equipment. --, therefor.

In Column 4, Lines 47-48, delete "equipment" and insert -- equipment. --, therefor.

In Column 5, Line 19, delete "LEA" and insert -- LEA. --, therefor.

In Column 7, Line 52, in Claim 3, delete "In" and insert -- in --, therefor.

In Column 8, Line 17, in Claim 6, delete "interception" and insert -- Interception --, therefor.

In Column 8, Line 50, in Claim 8, delete "intercept" and insert -- Intercept --, therefor.

In Column 8, Line 51, in Claim 8, delete "Unit Law." and insert -- Unit. --, therefor.

In Column 8, Line 58, in Claim 9, delete "mobile," and insert -- mobile --, therefor.

Signed and Sealed this
Twentieth Day of March, 2012

David J. Kappos
*Director of the United States Patent and Trademark Office*